United States Patent [19]
Auburn et al.

[11] Patent Number: 6,111,037
[45] Date of Patent: *Aug. 29, 2000

[54] SILICA-MODIFIED ALUMINOPHOSPHATE COMPOSITIONS, CATALYSTS, METHOD OF PREPARING SAME AND POLYMERIZATION PROCESSES

[75] Inventors: Pamela R. Auburn, Houston, Tex.; Theresa A. Pecoraro, Danville; Ignatius Y. Chan, Novato, both of Calif.

[73] Assignee: Chevron Chemical Company LLC, San Francisco, Calif.

[*] Notice: This patent is subject to a terminal disclaimer.

[21] Appl. No.: 08/961,825

[22] Filed: Oct. 31, 1997

Related U.S. Application Data

[63] Continuation-in-part of application No. 08/741,595, Oct. 31, 1996, Pat. No. 5,869,587, and a continuation-in-part of application No. 08/742,794, Oct. 31, 1996, Pat. No. 6,022,513.

[51] Int. Cl.$^7$ .......................... B01J 27/182; B01J 27/188; C08F 4/06; C08F 4/24
[52] U.S. Cl. ..................... 526/90; 502/210; 502/214; 526/95; 526/104; 526/106
[58] Field of Search .................................. 526/226, 233, 526/90, 95, 104, 106; 502/208, 210, 214

[56] References Cited

U.S. PATENT DOCUMENTS

| | | | |
|---|---|---|---|
| 3,342,750 | 9/1967 | Kearby | 423/308 |
| 4,080,311 | 3/1978 | Kehl | 526/226 |
| 5,869,587 | 2/1999 | Auburn et al. | 526/233 |

*Primary Examiner*—Wayne Langel
*Attorney, Agent, or Firm*—W. Bradley Haymond; James W. Ambrosius; W. Keith Turner

[57] ABSTRACT

An amorphous aluminophosphate composition is provided which exhibits a microstructure of sheets and spheres of silica-modified aluminophosphate. Also provided is a method for preparing the composition comprising mixing an aqueous solution containing aluminum ions, phosphate ions and silica ions, with a neutralizing solution, wherein the mixing is conducted with sufficient shear to produce on a microlevel, sheets of silica-modified aluminophosphate and spheres of silica-modified aluminophosphate. A polymerization catalyst and a polymerization process are also provided.

41 Claims, No Drawings

SILICA-MODIFIED ALUMINOPHOSPHATE COMPOSITIONS, CATALYSTS, METHOD OF PREPARING SAME AND POLYMERIZATION PROCESSES

This application is a continuation-in-part of U.S. Ser. No. 08/741,595, U.S. Pat. No. 5,869,587, and U.S. Ser. No. 08/742,794, U.S. Pat. No. 6,022,513, both filed Oct. 31, 1996.

FIELD OF THE INVENTION

This invention relates to silica-modified aluminophosphate compositions, catalysts and polymerization processes.

BACKGROUND OF THE INVENTION

Various aluminophosphate compositions are known in the art. These compositions can exhibit widely different physical properties such as surface area, pore size and pore size distribution. The terms aluminophosphate compositions, supports and precipitates are used interchangeably herein.

Many aluminophosphate compositions lack a combination of physical properties which characterize superior polymerization catalyst supports. For example, some aluminophosphate compositions exhibit low surface area and poor heat stability. Other supports with a high macropore volume do not exhibit good physical stability.

Other supports lack sufficient activity to be suitable catalysts. Previous methods employed a cocatalyst to boost activity; however, the presence of the cocatalyst increases the amount of undesirable low molecular weight portion in the polymer product. This low molecular weight material causes problems, such as smoking, during subsequent processing.

Other catalysts are not effective at incorporating comonomer during polymerization. Still other catalysts produce a polymer having a relatively broad molecular weight distribution, while some applications require a narrow molecular weight distribution.

SUMMARY OF THE INVENTION

It is an object of the present invention to provide a silica-modified aluminophosphate composition with excellent thermal stability.

It is another object of the present invention to provide a silica-modified aluminophosphate composition with excellent physical stability.

It is another object of the present invention to provide a silica-modified aluminophosphate composition with a relatively high amount of macroporosity.

It is another object of the present invention to provide a silica-modified aluminophosphate composition with a relatively high fragmentation potential.

It is another object of the present invention to provide a silica-modified aluminophosphate composition having a relatively large amount of macropores and sufficient physical strength that the composition does not fragment too easily.

It is another object of the present invention to provide a catalyst useful in reactions involving relatively large molecules.

It is another object of the present invention to provide catalysts which are effective in various types of polymerization processes.

It is another object of the present invention to provide catalysts which are sufficiently active that a cocatalyst is not necessary in a gas phase polymerization processes.

It is another object of the present invention to provide catalysts which produce polymer having a relatively low amount of low molecular weight component.

It is another object of the present invention to provide a polymerization catalyst with relatively high activity.

It is another object of the present invention to provide a polymerization catalyst which produces relatively high comonomer incorporation.

It is another object of the present invention to provide a polymerization catalyst which produces a polymer having a relatively narrow molecular weight distribution.

It is another object of the present invention to provide a polymerization process which produces a polymer which does not produce smoking during processing.

In accordance with the present invention an amorphous aluminophosphate composition is provided which exhibits a microstructure of sheets and spheres of silica-modified aluminophosphate. Also provided is a method for preparing the composition comprising mixing an aqueous solution containing aluminum ions, phosphate ions and silica ions with a neutralizing solution, wherein the mixing is conducted with sufficient shear to produce, on a microlevel, sheets of silica-modified aluminophosphate and spheres of silica-modified aluminophosphate. A catalyst and polymerization process are also provided.

DETAILED DESCRIPTION OF THE INVENTION

This application is a continuation-in-part of U.S. Ser. Nos. 08/741,595 and 08/742,794 both filed Oct. 31, 1996, the disclosures of which are incorporated herein by reference.

The inventive silica-modified aluminophosphate compositions, having the empirical formula $Al_2O_3 \cdot xAlPO_4 \cdot ySiO_2$, exhibit a microstructure of sheets and spheres of silica-modified aluminophosphate. The inventive aluminophosphate compositions have excellent thermal and physical stability together with a relatively high amount of macroporosity. These materials are particularly suited for use as catalyst support materials, especially for use in reactions involving relatively large molecules.

The silica-modified aluminophosphate compositions are prepared by the method comprising mixing an aqueous solution containing aluminum ions, phosphorous ions and silica ions with a neutralizing solution, wherein the mixing is conducted with sufficient shear to result in the formation of sheets and spheres on a microlevel.

As used herein, shear means shear rate which is a change in velocity ($\Delta V$) divided by a change in distance ($\Delta d$). The shear rate can be increased by increasing $\Delta V$ or decreasing $\Delta d$.

The aqueous solution is generally an acidic medium containing aluminum cations and phosphate anions. Suitable sources of aluminum ions include inorganic aluminum salts. The aluminum salt can be any aluminum salt which is soluble in water such as aluminum nitrate, aluminum chloride, aluminum sulfate, pseudo-boehmite, aluminum hydroxide, or aluminum alkoxide. Typically, the source of phosphorous ions is phosphoric acid.

The concentration of aluminum salt can vary broadly. Generally, the concentration of aluminum salt will be in the range of from about 12 to about 80 weight percent of the aqueous solution prior to neutralization, preferably from about 30 to about 70 weight percent, and more preferably from 60 to 70 weight percent. The use of the lower concentration of aluminum salts results in the formation of harder aluminophosphate precipitates.

The phosphorous ions are present in an amount such that the phosphorous to aluminum mole ratio is similar to the phosphorous to aluminum mole ratio desired in the final product. The mole ratio of phosphorous to aluminum in the aqueous solution is generally about 0.01 to about 2, preferably about 0.1 to about 1. The phosphorus to aluminum mole ratio for the aluminophosphate product is about 0.01 to about 2, preferably in the range of from 0.1 to about 1, more preferably from 0.2 to 0.8, and most preferably from 0.4 to 0.6.

Suitable sources of silicate ions include inorganic silicate salt and aqueous silica gels which are soluble in water. The silicate salt can be any silica salt such as alkali metal silicates. Excellent results have been obtained with sodium silicate and it is preferred.

The concentration of silicate salt can vary broadly in the aqueous solution prior to neutralization. Generally, the concentration of silicate salt will be varied to yield silica in the product with the empirical formula $Al_2O_3.xAlPO_4.ySiO_2$, where y, the mole ratio of silica, is 3 or less, preferably 2 or less and most preferably 1 or less. Or, expressed another way, the mole ratio of phosphorus to silicon is from about 20 to about 0.05. In a preferred embodiment, the mole ratio of phosphorus to silicon is from about 10 to about 0.05. In a more preferred embodiment, the mole ratio of phosphorus to silicon is from about 4 to about 2.

Generally, the neutralizing material is a base such as an aqueous solution of ammonia such as ammonium hydroxide, ammonium carbonate, ammonium bicarbonate or urea. It is preferred that the concentration of the salts and the base be high, so that on mixing of the two streams, a precipitate is immediately formed.

The neutralization is controlled so the pH of the neutralized reaction mixture is in the range of from about 4 to about 11, preferably from about 6 to about 11, and more preferably from 7 to 10.

The neutralization is conducted by adding controlled amounts of (i) the aqueous solution containing aluminum, phosphate and silica ions and (ii) the neutralizing medium to a high shear mixer/reactor in a continuous manner. The neutralization reaction is substantially instantaneous and is exothermic.

Alternatively, the aqueous solution can be a basic solution of salts such as a mixture of sodium aluminate and sodium phosphate which is neutralized with an acid solution such as HCl. The concentration of salts and the neutralization is conducted as disclosed above.

Preferably, the composition is prepared by the method comprising the continuous addition of the aqueous solution and neutralizing medium to a high shear mixer/reactor, and the continuous removal of the silica-modified aluminophosphate precipitate as it is formed. The silica-modified aluminophosphate precipitate can be quenched and/or cooling means can be used to lower the reactor temperature. Generally, the temperature in the reactor is in the range of from about 20° C. to about 90° C.

The key element in the preparation of the silica-modified aluminophosphate compositions is mixing the reactants with sufficient shear force to produce the formation of a silica-modified aluminophosphate composition containing sheets of silica-modified aluminophosphate as well as spheres of silica-modified aluminophosphatein the microstructure of the composition.

Various types of mixing techniques and apparatus are suitable for generating varying levels of shear delivery mixing. See, for example, "Scaleup and Design of Industrial Mixing Processes" by Gary B. Tatterson, McGraw-Hill, Inc., (1994), the disclosure of which is hereby incorporated by reference. Figure 2.9 illustrates the shear level of various types of mixers and impellers. Colloid mills, saw blade-type impellers; homogenizers and rotor stator mixers provide the highest level of shear while the hydrofoil and propeller provide the lowest shear. The newer jet stream mixers can also be employed with sufficient shear as taught herein.

One suitable mixer is a rotor stator mixer where the fluids to be mixed usually are pumped in the rotor stator chamber through concentric tubes. The rotor stator chamber consists of a rotor revolving at some desired rate and a "stator" or surrounding wall close to the tips of the revolving rotor. The wall is provided with openings to permit the mixed fluids to be removed or withdrawn quickly and continuously from the rotor-stator chamber.

Using the rotor stator mixer as an example, the velocity of the fluid is highest at the tip of the rotor impeller and is zero at the wall. Thus, the $\Delta V$ is taken as the velocity at the tip which can be calculated by multiplying the revolutions of the rotor per second times the radius of the rotor thus:

$$\Delta V = ND/2$$

where N is the number of revolutions of the rotor per second and D is the diameter of the rotor.

The change in distance, $\Delta d$, is the distance over which the change in velocity is measured, for example, the distance between the tip of the impeller and the wall in a rotor sator. Shear rates have the units of reciprocal time.

The apparent average shear rate is defined as the change in velocity over the change in distance and is calculated by the equation:

$$\text{Apparent Average Shear Rate} = \frac{\pi ND}{W}$$

N is the number of revolutions of the impeller per second, W is the distance between the tip of the impeller and the wall of the mixer, and D is the diameter of the rotor in the case of rotor-sator mixers, or can be the thickness of the impeller blade for other mixers.

The shape of the impeller and the design of the stator have an effect on the amount of shear developed. The stator, for example, can be a cylindrical wall provided with slots or can be a cylindrical screen.

The reactants are fed into the reactor/mixer and the aluminophosphate precipitate removed as it is formed. As noted above, it is preferred to use relatively concentrated solutions of aluminum and phosphorous so that on neutralization a precipitate is formed immediately. The neutralization reaction occurs rapidly and aluminophosphate precipitate is removed in times of from 0.5 to 5 seconds. Typically, the reaction and mixing occurs in less than 1 second.

It has been found that the apparent average shear rate should be at least $0.5 \times 10^4$ reciprocal seconds to result in the formation of sheets of aluminophosphate on the microlevel, preferably in the range of from $1 \times 10^4$ to $10 \times 10^4$ reciprocal seconds.

The aluminophosphate product can be quenched if desired and then washed to reduce the concentration of residual salts. Removal of residual salt is generally desired because such salts can act as poisons to catalytic metal deposited on the support. However, some residual salt level can help maintain the stability of the aluminophosphate structure and preserve the sheets of aluminophosphate in the microstructure.

Typically, the initial conductivity of the water wash is from 30,000 mmohs to 100,000 mmohs. Washing is conducted to reduce the conductivity from the initial value to some lower value, but greater than about 500 mmohs, typically from about 2,000 mmohs to about 4,000 mmohs.

Employing a quench procedure to reduce the temperature of the aluminophosphate precipitate will affect the size of the pores in the final product. Quenching to a temperature of from 18° C. to 30° C. tends to make an aluminophosphate composition having a narrower distribution of pores whereas non-quenching of the product tends to broaden the pore size distribution in the product. The distribution of pore size and pore volume can be affected by the use or non-use of a quench and whether washing is done with either hot water or cold water.

The use of hot washing and hot aging tends to shift the aluminophosphate composition to a larger pore volume and a larger macropore volume. By hot washing is meant that the aluminophosphate composition is washed with water which has been heated to a temperature of 45° C. to 80° C. By hot aging is meant that the product simply sits in a hold vessel for 1 to 4 hours at a temperature from 45° C. to 80° C.

The preferred technique of washing and filtration is by the use of a vibrating filtration membrane. When a vibrating filtration membrane is employed, the aluminophosphate is not compacted as a cake so that washing and filtration occur much more quickly than with non-vibrating techniques.

After the water has been reduced to the desired conductivity level, the water washing is stopped and the hydrogel is concentrated to a level of 12 percent to 22 percent solids, depending on which type of subsequent drying is employed. The temperature of drying is usually from 100° C. to 130° C. for times varying from 6 to 30 hours. Spray drying is very rapid and results in the formation of small-particle size beads which are suitable for use in fluid bed type operations.

After drying, the precipitates or the beads are generally calcined in the presence of air or oxygen. Usually, the heating is done at a temperature from about 300° C. to about 800° C. for a time of up to 16 hours, usually for a time of from 2 hours to 16 hours.

The silica-modified aluminophosphate precipitates prepared as described above are amorphous and contain, in their microstructure, sheets of silica-modified aluminophosphate as well as spheres of silica-modified aluminophosphate.

Typically, the surface area of the silica-modified aluminophosphate composition is in the range of from about 90 to about 300 $m^2$/gram, preferably from 90 to 250 $m^2$/gram as determined according to the BET (Brunauer, Emmett, and Teller) method. Surface area is calculated using the BET equations as described in the Journal of the American Chemical Society 60, 309 (1938). The equations are used in conjunction with corrections proposed by Voet in Rubber World 139, 63, 232 (1958).

Under the BET method, a sample is degassed by heating and evacuating to 300° C. and a pressure not to exceed $10^{-3}$ Torr to remove adsorbed vapors from the surface. The sample is then evacuated and cooled to the boiling point of liquid nitrogen (77.3 K). The nitrogen adsorption isotherm is determined by subsequently adding known amounts of nitrogen gas to the sample at various low level pressures until the saturation pressure of nitrogen is reached. Each next dose of nitrogen is introduced to the sample only after the foregoing dose has reached equilibrium. The desorption isotherm is determined by measuring the incremental volume of nitrogen desorbed from the saturated sample for each successive small decrements in the ambient pressure. The pore size distribution is determined by analyzing the desorption data of the nitrogen isotherm. Computations are predicted from the Kelvin equation.

The macropore volume is defined as the volume occupied by pore sizes greater than 1000 Å. A relatively high macropore volume is particularly desirable for some end uses, such as the polymerization of olefins.

Generally, the macropore volume is greater than about 0.01 cc per gram, preferably the volume is about 0.1 cc per gram or greater, and more preferably from about 0.1 cc per gram to about 0.8 cc per gram, and most preferably from 0.1 cc per gram to 0.6 cc per gram as determined by the mercury porosimetry test according to ASTM D4284-88 where gamma is 473 dynes per cm and the contact angle is 140 degrees.

Spray drying followed by calcining at 450° C. for 8 hours typically yields aluminophosphate compositions with macropore volumes from about 0.1 cc per gram to about 0.6 cc per gram. Relatively higher macropore volume materials can be prepared by directly calcining the undried aluminophosphate filter cake in a muffle furnace.

The mesopore volume is defined as the volume occupied by pore sizes from 20 Å to 1000 Å. There are substantially no micropores (less that 20 Å).

The mesopore volume is generally 0.1 cc per gram or greater, preferably from about 0.2 cc per gram to about 1 cc per gram, more preferably from about 0.3 cc per gram to about 0.8 cc per gram, and most preferably from 0.5 cc per gram to 0.7 cc per gram as determined by the BET method.

The mean mesopore diameter of the new silica-modified aluminophosphate compositions is generally in the range of from 50 Å to 450 Å, preferably in the range of from 150 Å to 400 Å, and more preferably in the range of from 150 Å to 300 Å.

Polymerization catalysts are subject to attrition during activation and polymerization. Traditional techniques such as air jet testing can provide an effective model for attrition occurring during activation; however, such techniques do not provide an effective model for attrition occurring during polymerization.

The fragmentation potential and sonication number, as determined by sonication, can be used in determining the expected efficiency of a catalyst in a process where fragmentation will occur. It is believed that the sonication process closely resembles the fracturing process which can occur during polymerization. The catalyst particles break up due to the accumulation of polymer and pressure within the pore structure.

The "fragmentation potential", as used herein, is the percent increase in the percentage of particles which are smaller than 40 microns after sonication for 30 minutes in an aqueous medium plus a dispersant using an Horiba LA 900 instrument. It is preferred to presonicate the sample for 1 minute to break up any agglomerations to obtain a base value of particles smaller than 40 microns. When the catalyst is activated, as later described, the sonication number of the silica-modified aluminophosphate composition is generally from about 5 minutes to about 350 minutes.

Generally, the fragmentation potential is greater than about 10 percent, preferably about 30 percent or greater and more preferably in the range of from 20 percent to 60 percent. This is accomplished by mixing the reagents in the aqueous solution with sufficient shear and the concentration of reactants is sufficiently high.

As used herein, "sonication number" is the amount of time necessary to reach a mean particle size of 40 microns determined by using a Malvern Particle Size Analyzer with 300 mm focal length and an active beam length of 2 mm.

The sonication number is inversely proportional to the fragmentation potential.

The sonication number of the silica-modified aluminophosphate composition is generally from about 5 minutes to about 200 minutes, preferably from about 10 minutes to about 150 minutes, and more preferably from 20 minutes to 100 minutes.

The inventive silica-modified aluminophosphate compositions exhibit excellent thermal stability. Typically, the compositions exhibit less than thirty percent loss of surface area after heating at 600° C. for 2 hours versus heating for 8 hours at 30° C.

As discussed above, the silica-modified aluminophosphate compositions of this invention exhibit a microstructure of sheets of silica-modified aluminophosphate as well as spheres of silica-modified aluminophosphate. In order to observe the sheets, the silica-modified aluminophosphate is spray dried to form particles about 0.01 cm in diameter. Microscopic examinations of these particles is done using standard transmission electron microscope (TEM) techniques. For example, the TEM specimen is observed in the bright field imaging mode.

Microtomy technique is a well established specimen preparation technique in the field of transmission electron microscopy. The technique is described in standard reference published literature, for example T. F. Malis and D. Steele, "Ultramicrotomy for Materials Science", in "Workshop on specimen preparation for TEM of materials II", ed. R. Anderson, vol. 199, Materials Research Symposium Proceedings (MRS, Pittsburgh, 1990) and N. Reid, "Ultramicrotomy", in the "Practical Methods in Electron Microscopy" series, ed. A. M. Glauert, Publ. Elsevier/North Holland, 1975.

Microtomy technique involves embedding the sample in a resin, from a pellet by polymerizing the resin in a mold, then cut thin sections using a microtone equipped with a diamond knife. A preferred resin is L. R. White resin. The typical thin section has a thickness of about 0.06 microns. Care should be taken to embed whole aluminophosphate particles in order that views of the entire random cross sections of the aluminophosphate particles are presented.

It is also important that prudent sampling techniques are to collect the sample for the TEM specimen preparation step. The portion of aluminophosphate particles that are embedded is selected from a sample by sequentially dividing the originally collected sample into quarter portions until the desired amount of material suitable for the embedding process is reached.

For purposes of this specification, printed images of photomicrographs having a destination magnification of 12,000×±1200× is suitable. The term destination magnification is defined as the sum of the magnification on the negative image and the magnification that occurs when the negative is further magnified when printed to larger size. This destination magnification takes into account some newer machines which use cameras to produce a digital image onto a computer for possible printing at a later time.

The cross section of spheres by a plane as well as the projection of spheres onto a plane will both result in round features. In this case, the round particles tend to be smaller than the thickness of the microtome sections. Hence, the round particles are viewed in projection in the images.

The characteristic sheets of silica-modified aluminophosphate appear as lines in the micrographs. The sheets can also be observed by crushing the samples instead of by microtomy. Crushing the sample breaks apart the whole aluminophosphate particles into small fragments then scatters the fragments onto thin electron transparent supports.

An image analysis technique has been developed to quantify the amount of sheets per unit volume in a given sample. This is based on general mathematical expressions that relate the features of the microstructure (interfaces, lines, and points) and intersections with an arbitrary test line. The equations are set forth in C. S. Smith and L. Guttman, "Measurement of internal boundaries in three dimensional structures by random sectioning", Trans. AIME, vol. 197, p. 81, (1953).

A quantitative representation of the amount of sheet material in the aluminophosphate composition is represented by the equation:

$$S_v = 4N_L$$

$S_v$ is the interface area per unit volume, in units of $mm^2/mm^3$ or $micron^2/micron^3$.

$N_L$ is the average number of intersections per unit length between a random test line, and the traces of the extended surface in the image units of $mm^{-1}$ or $micron^{-1}$.

Explanations and example application of stereological analysis to the characterization of microstructures can be found in the text books by R. T. DeHoff and F. N. Rhines, "Quantitative Microscopy", Publ. TechBooks/McGraw Hill, 1968 and J. C. Russ, "Computer-Assisted Microscopy," Plenum Press, 1990.

An example for determining $N_L$ is as follows. Select at least five representative printed images of 8.5 in.×11 in. size at 12,000× destination magnification. Overlay a set of random test lines drawn on a transparent sheet of paper on the image. The orientation of these lines must be random with respect to the line features resulting from the sheets. The total length of these lines on the transparency should be at least 150 cm. The number of intersections between the test lines and the lines on the image is determined and divided by the total length of the test lines. The numerical results for $N_L$ should be presented in $micron^{-1}$. Care must be taken to convert the distances measured on the photomicrographs into correct units of length which includes the effect of the image magnification.

Generally, the silica-modified aluminophosphate compositions have an $N_L$ in the range of from about 0.01 $micron^{-1}$ to about 3 $micron^{-1}$, preferably from about 0.1 $micron^{-1}$ to about 3 $micron^{-1}$, more preferably from 0.1 $micron^{-1}$ to 2 $micron^{-1}$, and most preferably from 0.1 $micron^{-1}$ to 1 $micron^{-1}$.

The inventive silica-modified aluminophosphate compositions exhibit the combination of a relatively high macropore volume, 0.1 cc per gram or greater, a fragmentation potential of 30 percent or greater, and a mesopore volume of 0.1 cc per gram or greater. The combination of high macropore volume and a fragmentation potential above 30 generally results in an aluminophosphate which is physically unstable. This is not the case of the present silica-modified aluminophosphate composition, however.

The aluminophosphate compositions have a wide variety of uses including their use as a support for catalysts. In particular, the new silica-modified aluminophosphate compositions are useful as supports for alpha olefin polymerization catalysts, such as for the polymerization of ethylene. Because of their high macropore volume, the aluminophosphate compositions find use in the treatment of residua and gas oils, but can also be tailored for use as an FCC catalyst or for use in hydroprocessing such as hydrodenitrification, hydrodesulfurization, hydrocracking or hydrogenation.

Polymerization catalysts can be prepared by impregnating the aluminophosphate composition with a catalytic amount of at least one transition metal-containing compound. A catalytic amount is the amount necessary to polymerize the olefin.

Catalysts useful in the polymerization of olefins, such as ethylene, generally contain a transition metal selected from Groups IIIA, IVA, VA, VIA, VIIA, VIII, IB, and IIB such as titanium, zirconium, hafnium, vanadium, chromium, manganese, iron, cobalt, nickel, platinum, copper, or zinc.

Generally, the transition metal will be present in an amount of 0.1 weight percent or greater based on the total catalyst weight, preferably in the range of from about 0.1 weight percent to about 15 weight percent, more preferably in the range of from 0.1 weight percent to 10 weight percent.

Chromium and mixtures of chromium and titanium are especially preferred. Chromium compounds used in preparing the catalyst can be selected from various organic or inorganic forms of chromium. Suitable chromium compounds include chromic anhydride, chromium chloride, chromium nitrate, chromium acetate, and chromium trioxide. Preferably, the aluminophosphate composition impregnated with the chromium salt is calcined to convert the chromium to an oxide form.

When employing titanium, various titanium compounds can be used to prepare the catalysts. One preferred source for the titanium component is titanium tetraisopropoxide.

Generally, a chromium catalyst is prepared by impregnating a selected chromium compound onto the aluminophosphate support. Typically, a solution of the chromium compound can be admixed with an aqueous slurry of the aluminophosphate composition. The water can be removed by drying at 50° C. to 200° C. for several hours. One preferred method of drying is spray drying which yields relatively large particle sizes and eliminates the need for screening the catalyst. The catalysts are generally activated by heating in air or other oxygen-containing gas at 300° F. to 950° F.

In the alternative, a water-soluble transition metal compound, such as a chromium compound, can be incorporated into the aqueous solution containing aluminum ions and phosphate ions. The transition metal is thus precipitated with the aluminum and phosphorous. The precipitate is then dried and calcined as previously described.

Another type of catalyst can be prepared by depositing organochromium compounds on an activated support. The organochromium compound is typically dissolved in an appropriate solvent. The solvent is then removed by evaporation. Suitable organochromium compounds include dicyclopentadienyl chromium (II) and triphenylsilyl chromate. It is not necessary to heat activate the catalyst after the addition of the organochromium compound.

Although not required, a suitable cocatalyst can be employed to form a catalyst system. Examples of such cocatalysts are disclosed in U.S. Pat. No. 4,690,990, the disclosure of which is incorporated herein by reference. Suitable cocatalysts include triethylborane, diethylaluminum ethoxide, triethylaluminum, ethylaluminum sesquichloride. Generally, the cocatalyst is present in an amount up to about 15 mole percent of the catalyst system, preferably about 0.1 to about 12 mole percent of the catalyst system.

Typical olefin polymerization processes include slurry and gas phase polymerization. These processes differ significantly with respect to the dynamics of particle growth. Accordingly, catalysts which are effective in one olefin polymerization process are frequently not effective in another process. The inventive silica-modified aluminophosphate supports are effective in both batch and gas phase polymerization processes.

The catalysts are suitable for polymerizing at least one mono-1-olefin containing 2 to 12 carbon atoms, preferably 2 to 8 carbon atoms. Suitable olefins include ethylene, propylene, 1-butene, 1-pentene, 1-hexene, 4-methyl-1-pentene and octene.

The invention is especially effective for producing ethylene homopolymers and copolymers. Typical commoners include alpha-olefins containing from 3 to 12 carbon atoms. Preferred alpha-olefin comonomers are propylene, 1-butene, 1-pentene, 1-hexene and mixtures thereof. Dienes such as 1,3-butadiene, isoprene, piperylene, 2,3-dimethyl-1,3-butadiene, 1,4-pentadiene, 1,7-hexadiene and mixtures thereof are also suitable comonomers.

When employed, preferred amounts of the comonomer feed are in the range of from about 0.01 to about 10 mole percent of the total ethylene feed, more preferably about 0.1 to about 3 mole percent of the total ethylene feed, and most preferably 0.2 to 2.0 mole percent of the total ethylene feed.

The polymerization process can be carried out in various types of reactors. For example, a mechanically stirred reaction zone in a horizontal or vertical reactor or a fluidized bed in a vertically disposed reactor can be used. A fluidized bed is disclosed in U.S. Pat. No. 4,011,382. The bed of catalyst particles/polyethylene is fluidized by upwardly flowing ethylene gas.

The catalyst of this invention can be used in solution polymerization, slurry polymerization and gas phase polymerization techniques using conventional equipment and contacting processes.

Temperatures and pressures used in the polymerization process of the present invention are those sufficient for the polymerization of ethylene. Generally, polymerization temperatures are in the range of from about 50° F. to 250° F. Preferred pressures are below 500 psig, preferably between 100 psig and 500 psig, more preferably between 150 psig and 400 psig, and most preferably between 250 psig and 350 psig.

The present catalyst is especially suitable for slurry polymerization. The slurry or particle form process is generally carried out in an inert diluent such as paraffin, cycloparaffin or aromatic hydrocarbon. Temperatures employed are generally in the range of from about 50° C. to 150° C. Pressures generally range from 110 to 700 psia (0.65–4.8 Mpa) or higher. The catalyst is kept in suspension and is contacted with the monomer(s) under conditions sufficient to maintain at least a portion of the monomer in the liquid phase. The medium and temperature are selected so that the polymer is produced as solid particles and is recovered in that form. Catalyst concentrations are generally in the range of from about 0.001 to about 1 weight percent based on the weight of the reactor contents.

The present catalysts are also useful in gas phase fluid bed polymerization process. During the gas phase process, ethylene and/or other gaseous alpha olefins are injected into the bottom of a fluid bed reactor. Catalyst is injected appropriately into the reactor and polymer is formed and grows on the catalyst. The polymer particles must have a proper size to density or the fluid bed will tend to collapse during operation. Usually, the polymer mimics the shape of the prior art catalyst particles, which are generally spherical and uniform in size. Polymer particles prepared according to the present invention are irregularly shaped and exhibit a variety of sizes.

Conditions in the gas phase process can vary broadly. Generally, the temperature is in the range of from about 20° C. to about 200° C., preferably 50° C. to about 150° C. The pressure is typically in the range of from atmospheric to 70 kg/cm$_2$G, preferably from atmospheric to 70 kg/cm$_2$G.

Hydrogen can be used to control the molecular weight. When used, it is generally present in an amount up to about 2 mole percent of the reaction mixture, preferably with the range of about 0.1 to about 1 mole percent of the reaction mixture.

The following examples will serve to show the present invention in detail by way of illustration and not by way of limitation.

EXAMPLES

Example 1

Preparing Silica-Modified Aluminophosphate Precipitate

Silica-modified aluminophosphate precipitate was prepared by adding 6.49 Kg of deionized water to a mixing tank that was heated to 50° C. With mixing, 15 Kg of $Al(NO_3)_3 \cdot 9H_2O$ (97% by weight) was added to the water. Mixing was continued until the solid dissolved. The pH of the aluminum solution was about 0. To the aluminum solution was added 2,284.4 grams of phosphoric acid (85% by weight) with mixing.

A silicate solution was prepared by diluting 250 grams of a Banco sodium silicate solution (41° Be)(the specific gravity is 1.401). The silica solution was added to the aluminophosphate solution over a 5-minute period resulting in a solution having a pH of about 0.

A separate solution of ammonium hydroxide (15% by weight) was prepared. The aluminum, phosphorus and silica-containing solution and the ammonium hydroxide solution were simultaneously pumped into the mixing chamber of a Ross High Shear Mixer. The rate of addition of acid and base solution into the mixing chamber is set to achieve a pH of 8.0 at the outlet of the mixer.

The hydrogel was washed with deionized water until a conductivity level of about 3000 mmohs was achieved. The hydrogel was then concentrated to about 18 wt. % solids. The concentrated hydrogel was pumped to the feed system of a Stark Bowen BE 1235 spray dryer and dried. The spray dryer conditions were varied, by means well known to those having ordinary skill in the art, to achieve a desired particle size, LOM weight percent and other desired characterized. The spray dired powder was calcined at 450° C. for 8 hours in a fixed fluid bed reactor.

Example 2

Preparing Catalyst

Catalyst was prepared by dissolving a predetermined amount of $CrO_3$ in deionized water and adding the $CrO_3$ solution to a slurry of a predetermined amount of silica-modified aluminophosphate in deionized water. The mixture was placed in an evaporating flask which was attached to a vacuum and placed in a hot water bath at 80° C. When the water was evaporated, the thus prepared chromium catalyst was removed and employed in various polymerization runs.

Example 3

Analyzing the Microstructure of Silica-Modified Aluminophosphate

The composition of the silica-modified aluminophosphate sheets were analyzed by the energy dispersive x-ray (EDX) spectrometry method carried out inside the transmission electron microscope (TEM). This is a well known technique within the field of electron microscopy. The only physical requirement to perform this analysis is for the TEM to be fitted with an EDX detector and the associated computer hardware and software to analyze the EDX spectrum. These are considered as standard accessories to the TEM and there are many commercial manufacturers of EDX systems. The spectrum from the TEM-EDX analysis reveals the elemental composition of the material being irradiated by the electron beam probe.

In this case, the composition of the sheet structures were obtained by condensing the electron beam into a small probe by adjusting the condenser lens current. The size of the probe was chosen such that it was smaller than the width (thickness) of the sheet to be analyzed. This small electron probe was placed exactly on the sheet structure and an EDX spectrum was acquired. The acquisition was stopped when sufficient number of counts were accumulated, to the point where it was deemed statistically satisfactory to make a judgment on whether Si was present. The same process was repeated for many sheet structures.

For the elemental composition of the silica-modified aluminophosphate spheres in the matrix, the same procedure was carried out but the electron beam probe chosen was generally of a larger size. The critical point in choosing the size and placement of the electron beam probe was to make sure that the analyzed areas did not contain sheet structures.

This EDX analysis verified that Si was present in both the sheets and the spheres.

Example 4

Catalyst Activations

Catalyst activations were performed on a bench-scale 28 mm diameter fluidized bed under a stream of dry air at 600° C. for 8 hours. The activator tube is constructed from a 28 mm diameter quartz tube, a medium quartz frit, and a 67 mm diameter quartz disengaging section. The fluidization section is 300 mm long from the frit to the half angle transition, and the disengaging section is 400 mm tall. The transition incorporates an 11° half angle. The whole activator tube is enclosed in a 1100° C. Lindberg tube furnace and can be purged with dry argon or low dewpoint air, typically at ~1 L/min. Gas flow direction is from the bottom to the top, and a cyclone trap is connected to the outlet to collect fines, which might otherwise escape into the atmosphere.

Example 5

Batch Polymerization Runs

Polymerizations were performed in two liter autoclave reactors equipped with Genesis control systems. A dried 316 stainless steel two liter Autoclave Engineers Zipperclave reactor system was heated at 80° C. under vacuum until a pressure of <50 microns of Hg was achieved. The reactor was then charged with a mixture of 200 mg catalyst and 0.5M (0.65 mg) of isobutylaluminoxane (Al to Cr ratio of 5) in 200 mL heptane contained in a 500 mL glass addition funnel that was fitted with a Kontes vacuum valve. The isobutylaluminoxane was added to scavenge unwanted catalyst poisons such as oxygen. A Kontes valve was connected to the reactor on a Cajon Ultra-Torr fitting, and the mixture was introduced into the reactor under vacuum. The reactor was stirred at 550 rpm and ethylene was introduced to an internal setpoint pressure of 300 psig. The reactor temperature was maintained at the setpoint temperature 80° C. with a Neslab RTE-100 water-bath/circulator. The reaction was allowed to proceed to a given productivity, typically depletion of 80 L of ethylene after which the reactor was vented and purged twice with argon and shut down. The reactor was opened while it was still hot and the contents were quickly removed. The reactor was cleaned and prepared for the next reaction. Table 1 shows the results of five reactions performed as described above.

TABLE 1

| Run | $Al_2O_3 \cdot 2AlPO_4 \cdot xSiO_2$ mole % | Cr wt. % | Run Time hr. | Activity g PE/ g Cat. · hr. |
|---|---|---|---|---|
| 101 | 0.5 | 0.7. | 0.91 | 575 |
| 102 | 0.5 | 0.35 | 0.79 | 529 |
| 103 | 1 | 0.35 | 0.78 | 497 |
| 104 | 0.5 | 0.7 | 1.02 | 605 |

What is claimed is:

1. An amorphous aluminophosphate composition having a microstructure exhibiting sheets of aluminophosphate and spheres of aluminophosphate, both of which contain silica.

2. The composition of claim 1 wherein the composition has a fragmentation potential of 15 percent or greater as determined after sonication for 30 minutes in an aqueous medium plus a dispersant using an Horiba LA 900 instrument.

3. The composition of claim 2 wherein the composition has a fragmentation potential in the range of from 20 percent to 60 percent.

4. The composition of claim 1 wherein the composition has a sonication number in the range of from 5 minutes to 200 minutes determined by using a Malvern Particle Size Analyzer with 300 mm focal length and an active beam length of 2 mm.

5. The composition of claim 2 wherein the composition has a macropore volume of 0.1 cc per gram or greater as determined according to ASTM D4284-88 where gamma is 473 dynes per cm and the contact angle is 140 degrees.

6. The composition of claim 5 wherein the composition has a macropore volume in the range of from 0.1 cc per gram to 0.8 cc per gram.

7. The composition of claim 6 wherein the composition has a mesopore volume of about 0.1 cc per gram or greater as determined by the BET method.

8. The composition of claim 7 wherein the composition has a mesopore volume in the range of about 0.2 cc per gram to 1 cc per gram.

9. The composition of claim 8 wherein the composition has a mean mesopore diameter in the range of from 50 Å to 450 Å.

10. The composition of claim 9 wherein the composition has a mean mesopore diameter in the range of from 150 Å to 400 Å.

11. The composition of claim 10 wherein the composition has substantially no pores less than 20 Å.

12. The composition of claim 5 which has an $N_L$ in the range of from about 0.01 micron$^{-1}$ to about 3 micron$^{-1}$ in a photomicrograph at about 12,000×±1200× magnification.

13. The composition of claim 12 which has an $N_L$ in the range of from about 0.1 micron$^{-1}$ to about 3 micron$^{-1}$ in a photomicrograph at about 12,000×±1200× magnification.

14. The composition of claim 5 wherein the mole ratio of phosphorous to aluminum is from about 0.2 to about 1.

15. The composition of claim 14 wherein the mole ratio of phosphorus to silicon is from about 20 to about 0.05.

16. The composition of claim 15 wherein the mole ratio of phosphorus to silicon is from about 10 to about 0.05.

17. The composition of claim 15 wherein the mole ratio of phosporus to silicon is from about 4 to about 2.

18. The composition of claim 5 wherein the surface area is in the range of from about 90 to about 300 m$^2$/gram as determined according to the BET method.

19. A catalyst comprising the composition of claim 1 impregnated with a catalytic amount of at least one transition metal-containing compound.

20. The catalyst of claim 19 wherein the at least one transition metal-containing compound is a chromium compound.

21. The catalyst of claim 19 wherein the at least one transition metal-containing compound is present in an amount of 0.1 weight percent or greater based on the total catalyst weight.

22. The catalyst of claim 21 wherein the at least one transition metal-containing compound is present in an amount in the range of from about 0.1 weight percent to about 10 weight percent.

23. A polymerization process comprising contacting the catalyst of claim 19 with at least one alpha-olefin under polymerization conditions.

24. A method for preparing a silica-modified aluminophosphate composition comprising mixing an aqueous solution containing silicate ions, aluminum ions and phosphate ions with a neutralizing solution, wherein the mixing is conducted in a mixer-reactor with sufficient shear to produce on a microlevel sheets of silica-modified aluminophosphate and spheres of silica-modified aluminophophate, said shear being at a rate of at least 0.5×10$^4$ reciprocal seconds, and wherein said silica-modified aluminophosphate is removed from the mixer-reactor substantially as quickly as it is formed.

25. The method according to claim 24 wherein the aluminum ion is derived from an aluminum salt and the concentration of aluminum salt is in the range of from about 12 weight percent to about 80 weight percent of the aqueous solution prior to neutralization.

26. The method according to claim 25 wherein the concentration of aluminum salt is in the range of from about 30 weight percent to about 70 weight percent.

27. The method according to claim 26 wherein the mole ratio of phosphorous to aluminum in the aqueous solution is in the range of from about 0.2 to about 1.

28. The method according to claim 27 wherein the silicate ion is derived from a silicate salt and the silica-modified aluminophosphate composition has a mole ratio of phosphorus to silicon of from about 20 to about 0.05.

29. The method according to claim 28 wherein the silica-modified aluminophosphate composition has a mole ratio of phosphorus to silicon of from about 10 to about 0.05.

30. The method according to claim 28 wherein the silica-modified aluminophosphate composition has a mole ratio of phosphorus to silicon of from about 4 to about 2.

31. The method according to claim 30 wherein the source of phosphate ions comprises phosphoric acid.

32. The method according to claim 31 wherein the solution is neutralized to a final pH in the range of from 4 to 11.

33. The method according to claim 32 wherein the solution is neutralized to a final pH in the range of from 6 to 11.

34. The method according to claim 33 wherein the neutralizing solution comprises ammonium hydroxide, ammonium carbonate, ammonium bicarbonate or urea.

35. The method according to claim 34 wherein the aqueous solution and the neutralizing solution are added continuously to the mixer-reactor.

36. The method according to claim 34 further comprising quenching the silica-modified aluminophosphate composition upon formation with a sufficient amount of water to reduce the temperature of the reaction medium to 18° C. to 30° C.

37. The method according to claim 36 further comprising washing the composition to reduce the conductivity of the effluent water to a value less than the starting conductivity, but greater than about 500 mmohs.

38. The method according to claim 37 wherein the conductivity of the effluent water is in the range of from about 2000 mmohs to about 4000 mmohs.

39. The method according to claim 38 wherein the washed silica-modified aluminophosphate composition is spray dried.

40. The method according to claim 39 wherein the dried silica-modified aluminophosphate composition is calcined at a temperature in the range of from about 300° C. to about 800° C.

41. The method according to claim 40 wherein the calcined silica-modified aluminophosphate composition exhibits a sonication number in the range of from 5 minutes to 350 minutes determined by using a Malvern Particle Size Analyzer with 300 mm focal length and an active beam length of 2 mm.

* * * * *